Figure 2:
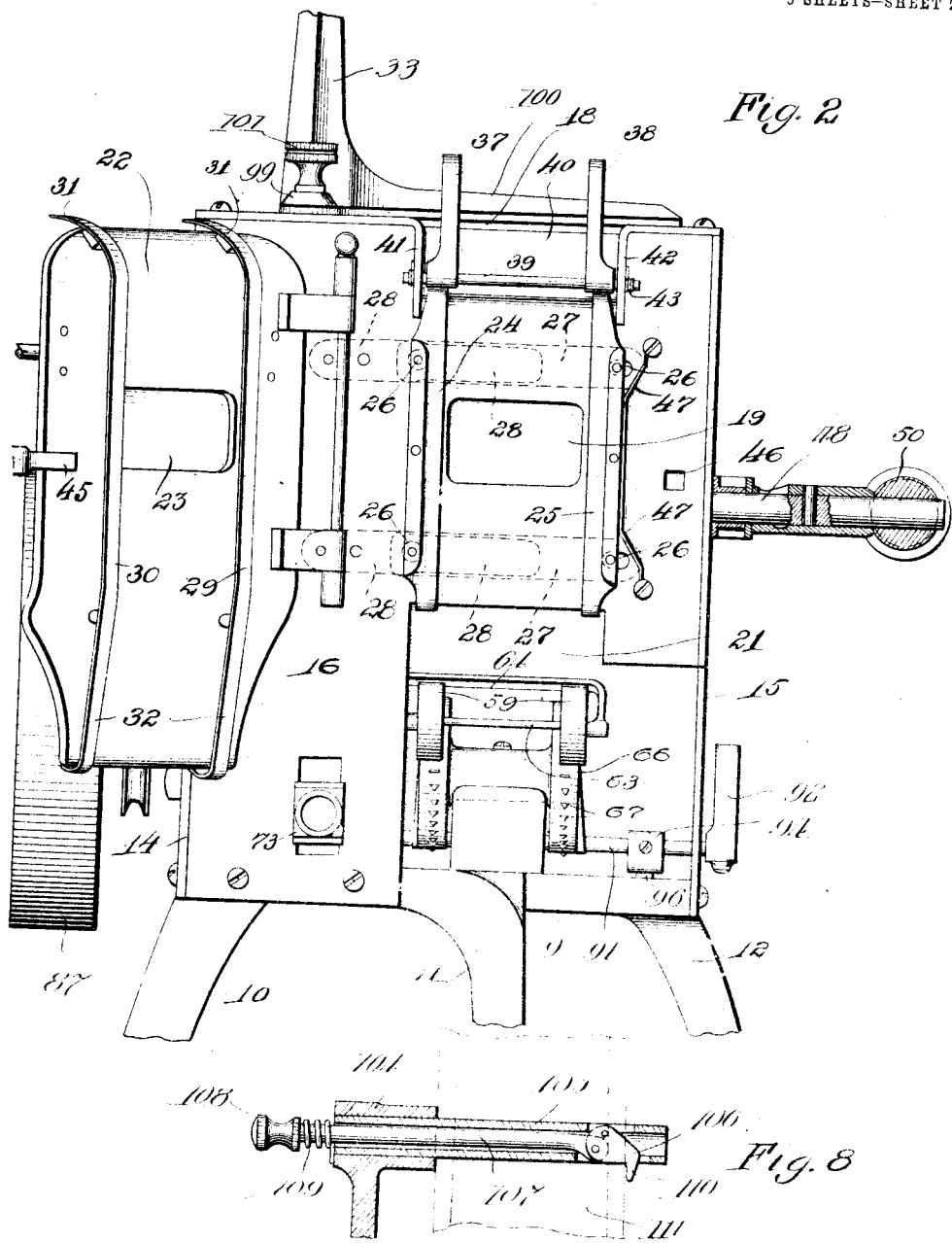

E. H. SPERBERG.
MOVING PICTURE MACHINE.
APPLICATION FILED JAN. 3, 1911.
1,025,887.
Patented May 7, 1912.
5 SHEETS—SHEET 1.
Fig. 1
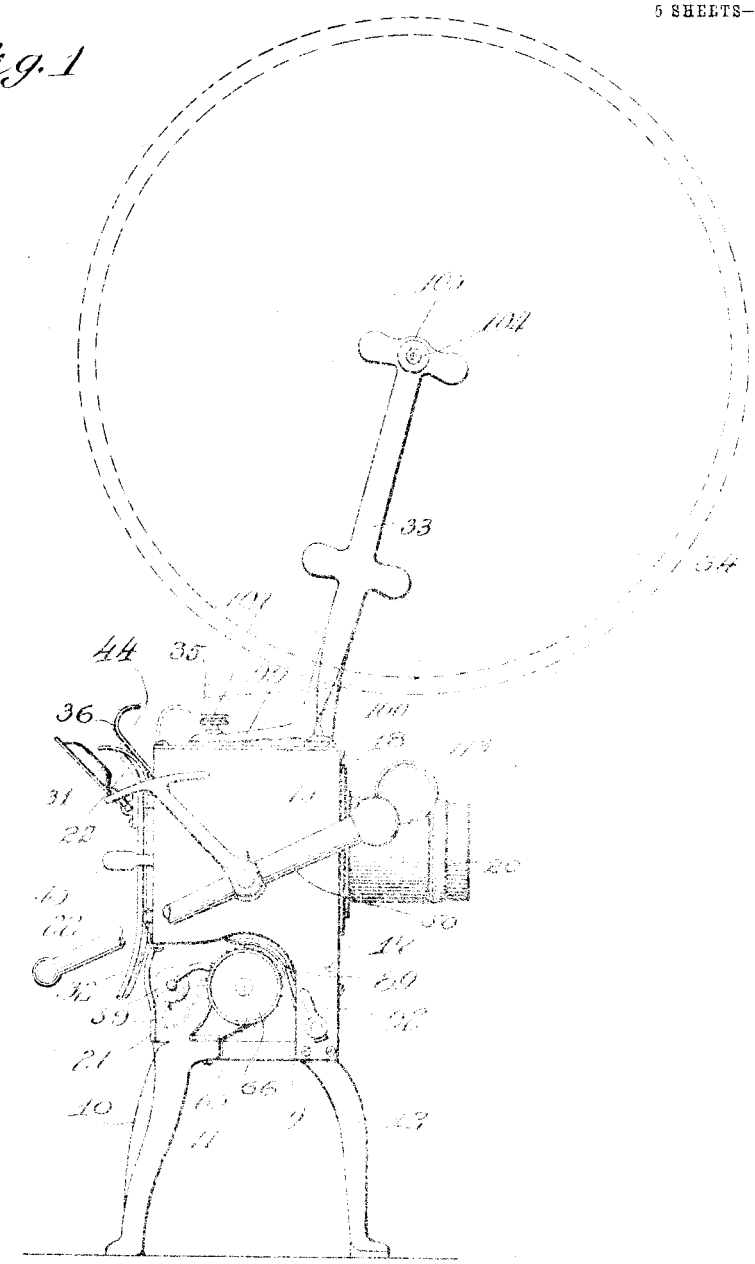
WITNESSES
INVENTOR

E. H. SPERBERG.
MOVING PICTURE MACHINE.
APPLICATION FILED JAN. 3, 1911.

1,025,887.

Patented May 7, 1912
5 SHEETS—SHEET 4.

WITNESSES
Harry S. Gaither
Ephraim Banning

INVENTOR
Edward H. Sperberg
by Banning & Banning
att'ys

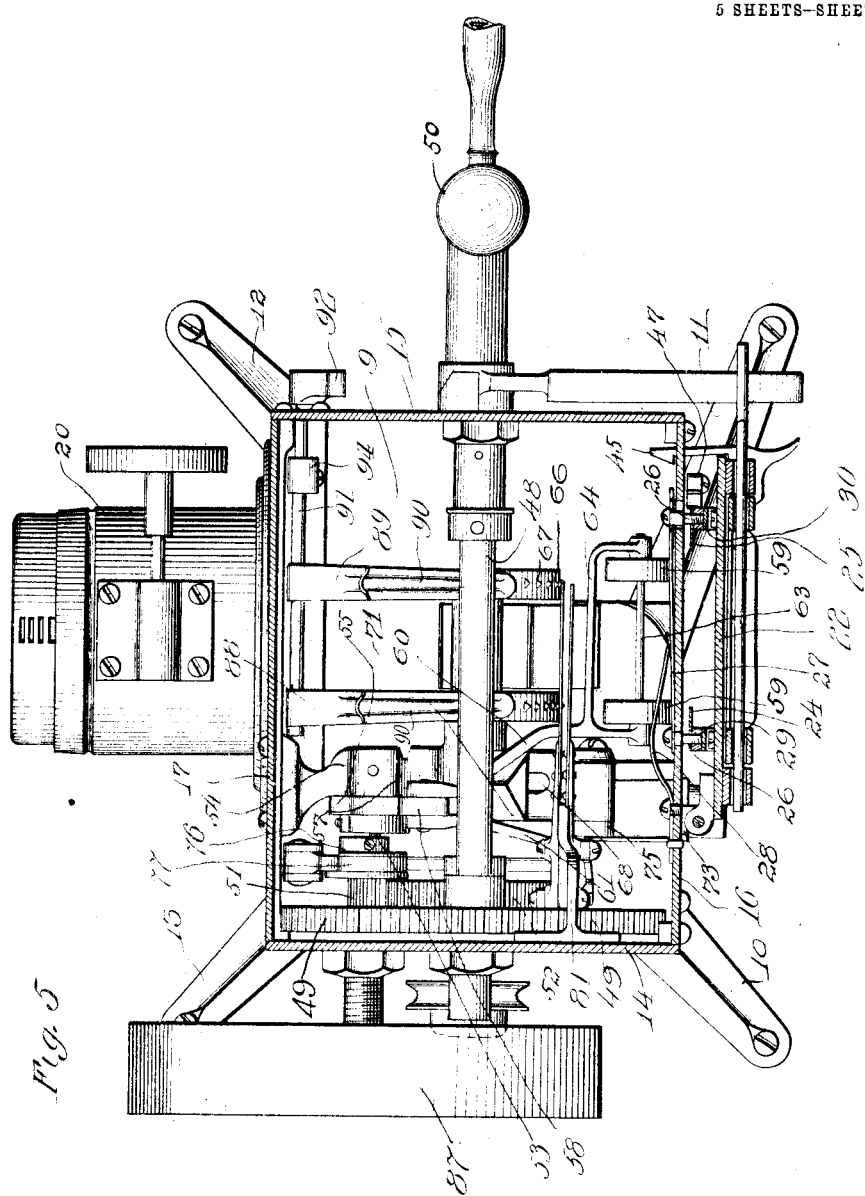

UNITED STATES PATENT OFFICE.

EDWARD H. SPERBERG, OF CHICAGO, ILLINOIS, ASSIGNOR TO OSCAR F. FOSS, OF CHICAGO, ILLINOIS.

MOVING-PICTURE MACHINE.

1,025,887.  Specification of Letters Patent.  Patented May 7, 1912.

Application filed January 3, 1911. Serial No. 600,533.

*To all whom it may concern:*

Be it known that I, EDWARD H. SPERBERG, a citizen of the United States, residing at Chicago, in the county of Cook and State of Illinois, have invented certain new and useful Improvements in Moving-Picture Machines, of which the following is a specification.

This invention relates to moving picture machines of the general class in which the film is moved intermittently, past an aperture through which light is projected upon a screen; and relates particularly to those machines in which use is made of a shutter for cutting off the passage of light during the intervals of movement of the film, but is not limited to the use of such a shutter, inasmuch as it is found that the present machine may be designed and built to move the film so quickly that the shutter may be dispensed with.

The invention further relates to a novel form of film feeding or advancing mechanism, and to the means for framing the film so that the individual pictures of it will properly register before the aperture opening.

The film feeding mechanism of the present invention is peculiarly related to the framing mechanism, so that the two virtually comprise one and the same mechanism, owing to a certain peculiar coaction or corelation between the parts, as will be more particularly pointed out in this specification.

The principal object of the present invention is to provide a film feeding mechanism which may be designed to advance the film with great quickness, so that only a small percentage of the total time is consumed in moving the film, thus leaving a large percentage of time during which the film is stationary. The mechanisms are particularly designed so that this quickness of movement may be obtained with the minimum detriment to the film, because it has been found that in previous constructions a certain practical limit of quickness has existed beyond which one may not go without greatly deteriorating the film. In order to advance the film quickly, that is, during a small percentage of the total time, the film must be accelerated and then stopped during each movement. The amount of deterioration of the film depends largely upon the rate of this acceleration. The film feeding mechanism is one in which the rate of acceleration can be predetermined, so that it shall not be unnecessarily large, in order to feed the film during the given percentage of time. This enables me to feed the film with the desired quickness but with the minimum amount of jerk and consequent deterioration.

Other objects of the present invention are, to provide an extremely simple mechanism, one which may be used with or without a shutter, as desired; one in which the parts shall be thoroughly inclosed and protected; one in which the film feeding mechanism will cease to operate instantaneously in case the film breaks or the feeding mechanism becomes disarranged; to provide a mechanism which shall operate with great smoothness and ease; to provide means for permitting the film to advance into the feeding mechanism intermittently while the main roll of film rotates continuously; to provide a construction which will permit the film to be threaded through the machine easily and accurately preparatory to feeding it; to provide means for insuring that the film shall lie smoothly across the aperture; to provide a novel form of device for holding the film in secure engagement with the draw roll; to provide a novel form of catch for retaining the film roll in position, and for permitting the same to be withdrawn when the film has been completely run through the machine, or to permit a new film to be substituted; and in other ways and manners to generally improve the construction of this class of machines.

Other objects and uses will appear from a detailed description of the invention, which consists in the features of construction and combination of parts hereinafter described and claimed.

Figure 3:
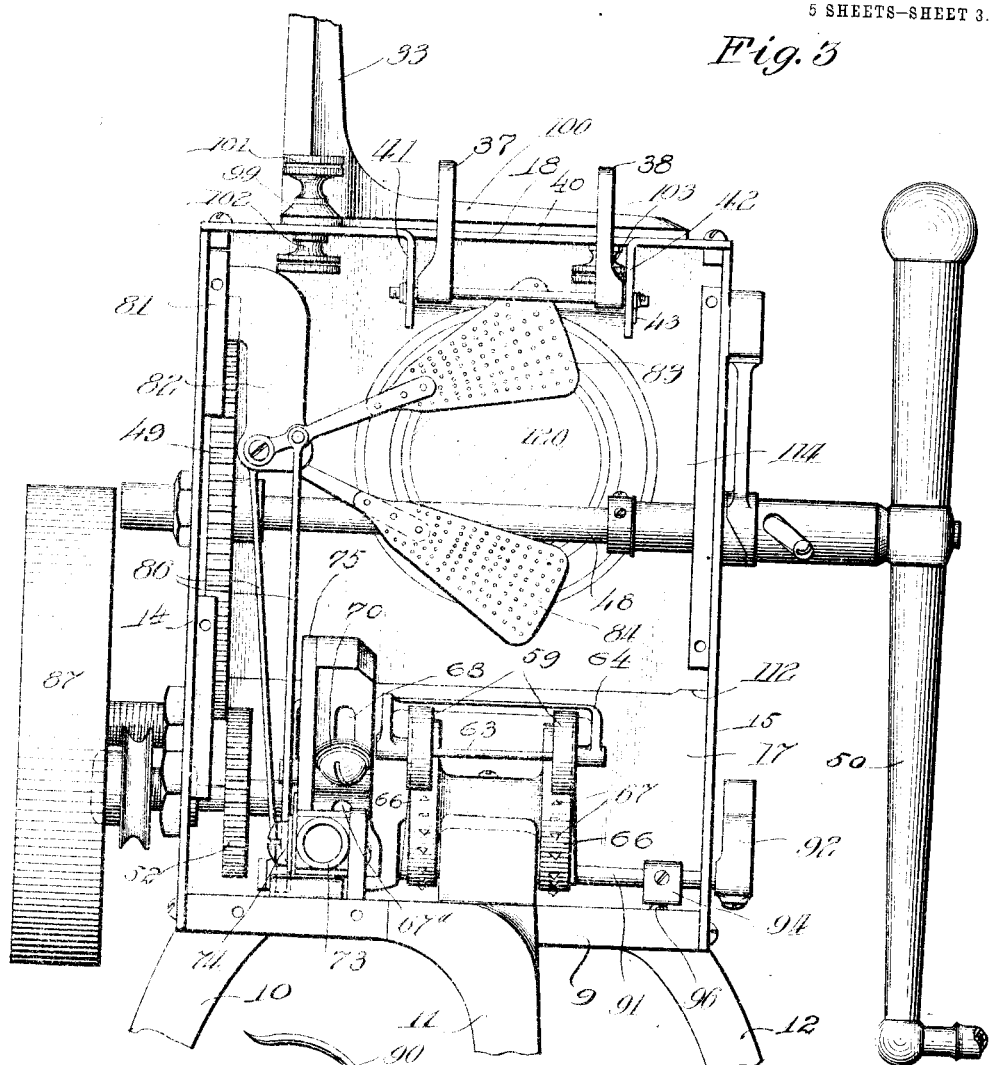
Figure 4:
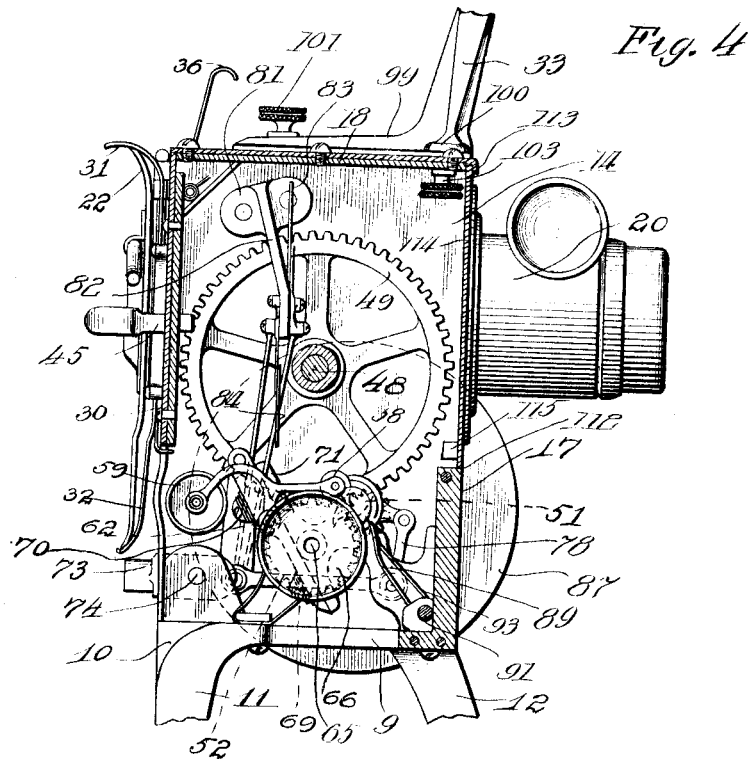
Figure 6:
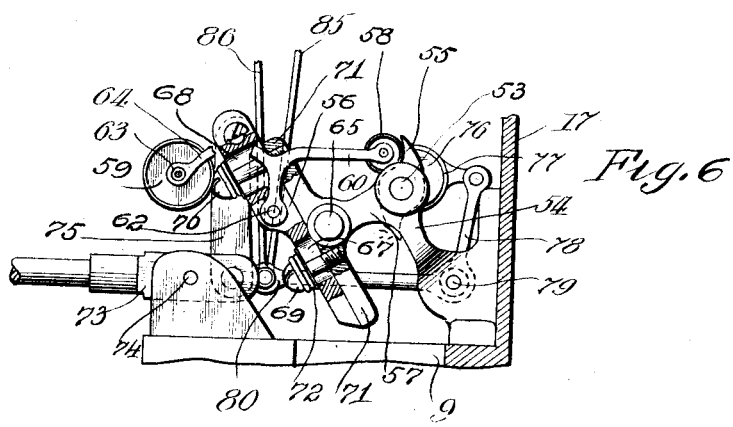

Referring now to the drawings, in Figure 1, I show a side view of my improved moving picture machine, looking toward the handle side thereof, the handle being broken away near its middle portion to show more clearly the door behind, the fire door being in open position, the feed roll and the tension mechanism being shown in their initial position by full lines, and in the position which they occupy at the end of a stroke by means of dotted lines; in Fig. 2 I show an enlarged front view of the machine, the film door being in open position to show the relation which the pressure rods bear to the flexible film guideways, the operating crank being in section; Fig. 3 shows the interior view of the mechanism, looking toward the rear wall, and shows the parts as they would appear if the front wall alone were removed when the parts were in the position which they occupy when the film is at rest, the kicking rolls being framed to feed the film near the upper framing limit; Fig. 4 is a vertical section through the machine, showing particularly the film door and the film feeding mechanism which is shown in the position of rest; Fig. 5 is a cross section taken at a point above the main shaft; Fig. 6 is a detail side view of the main operative parts, showing particularly the kicking rolls, the cam for operating them, the framing mechanism for raising and lowering them, and the mechanism for operating the shutters; Fig. 7 is a detail of the pressure fingers used for holding the film securely in mesh with the draw sprocket; and Fig. 8 is a detail of my improved film roll shaft and the mechanism for holding the film roll in place on the same.

In the embodiment of my invention I provide a film draw sprocket, which rotates at uniform speed to deliver the film to any receiving device, such as a roll or a basket. In order to draw the film intermittently past the aperture, I provide means for intermittently forcing it down at a point in advance of the film draw sprocket. This mechanism, which I call the kicking mechanism, is so proportioned with respect to the sprocket that the film will be advanced past the aperture a distance equal to one picture each time it is kicked. While the kicking mechanism is being restored to its initial position preparatory to taking a new stroke, the sprocket withdraws the film which was previously kicked into a loop, so that when the time arrives for the next stroke the film will be practically taut and the loop disposed of. In the preferred construction, this kicking mechanism comprises one or more rolls carried by a light framework which may be kicked in one direction with the proper quickness, as by means of a cam. In order to relieve the film from the excess tension which would come upon it, if it became necessary to start the entire roll of film each time a stroke was performed, I provide means for keeping the full reel rotating at a practically uniform speed sufficient to supply the film at the average rate with which it is used. Evidently the limits between which each picture of the film will be started and stopped depend upon the upper and lower limits of oscillation of the kicking mechanism. Therefore, I have discovered that the film may be framed by providing mechanism for raising and lowering the kicking device so as to determine the upper and lower limits of its movement.

Referring now to the drawings, the body of the machine comprises primarily a base plate 9 provided with legs 10, 11, 12, and 13. Side walls 14 and 15 act in conjunction with a front wall 16, a rear wall 17, and a top wall 18, to inclose the major portion of the mechanism. An aperture 19 in the front wall lines up with a projecting lens 20 in the rear wall, so that the light passes directly through the film and through the machine. The lower portion 21 of the front wall is cut away to facilitate inserting the film at the beginning of an operation. A film door 22 is hinged to the front wall at one side of the aperture thereof, and is provided with an aperture 23 which lines up with that in the front wall when the door is closed. Angles 24 and 25 serve as guideways for the film and are flexibly supported by the front wall of the machine. This may be done in any suitable way, but the preferred construction consists in providing each guideway with a pair of pins 26 which extend through the front wall and are rigidly attached to upper and lower spring leaves 27, inside of the machine. The latter in turn are normally pressed against the inner face of the front wall by means of springs 28, so that the guides are normally projected outward away from the front wall. A pair of smooth rods 29 and 30 are rigidly attached to the inner face of the door in such position that when the door is closed these rods will seat into the angles 24 and 25, respectively, and press the film against the latter. This will provide a flexible friction grip for holding the film taut and smooth in front of the aperture, and for providing a sufficient amount of friction on the film to prevent it from continuing its movement after the kick has ceased, notwithstanding its inertia. The rods 29 and 30 are preferably rounded at their upper ends 31, so as to remove all possibility of the film becoming caught on them, and at their lower ends 32 are also bent out to provide sufficient room for the movement of the kicking mechanism.

A removable bracket 33 is attached to the top of the machine and carries a film roll 34. The details of construction of this bracket will be brought out later in this specification. From the roll the film 35 passes forward and down over the takeup mechanism 36, which comprises a pair of fingers 37 and 38 attached to a shaft 39, which in turn is pivoted to the upper portion of the machine. This is preferably done by cutting away the upper central portion 40 of the front wall and then bending a portion of the top straight down to provide a pair of plates 41 and 42 in which the shaft 39 is journaled. A spring 43 tends to throw the fingers out into the full line position of Fig. 1, thus forming a loop 44 in the film. When the film is suddenly jerked down the film in this loop will be taken up and the fingers will be thrown over into the dotted line position. However, owing to the spring tension, the outward force on the fingers will be sufficient to maintain the film under a tension such that the reel will rotate at a practically constant speed, sufficient to meet the average demand for film.

A catch 45, of any suitable construction, engages a hole 46 in the front of the machine to keep the door closed. In order to compensate for slight irregularities in the width of the film, or in order to permit slight sidewise adjustment of the same, the pins 26 of the angle 25 are carried in the slots of the springs 27. A leaf spring 47 always acts to press the angle inward toward the other angle into the position shown in Fig. 2.

A main shaft 48 spans the interior of the machine from side wall to side wall, and carries near one end a main gear 49. A crank 50, of which I will presently describe the details, serves to rotate the shaft 48 in normal operation. The main gear 49 meshes with a pinion 51 of extra width, and a feed gear 52 in turn is driven from the pinion.

I will now describe the preferred form of film-advancing mechanism, including the mechanism used for securing an intermittent movement of the film. Referring particularly to Figs. 3, 4, 5 and 6, the pinion 51 is seen to drive a shaft 53, one end of which finds a bearing in the side wall 14, and the other end of which is carried by a bracket 54 attached to the rear wall 17. Adjacent the bracket this shaft carries a cam 55 of peculiar shape, which serves to operate the kicking mechanism. A framing bar 56 is slidably carried by an arm 57 of the bracket, in a peculiar manner, as will be hereinafter described. The kicking mechanism comprises essentially a light framework in the form of a bell crank, one arm of which is provided with a roller 58, which engages the cam 55, and the other arm of which carries one or more rollers 59 which press against the film. The cam arm is preferably bifurcated, so that its parts 60 and 61 straddle the framing bar and are pivoted thereto at 62. The preferred construction is one in which the rollers 59 are carried by a shaft 63, which is pivoted in a frame 64, carried to one side of the framing bar and in such position that the rollers line up with the sides of the film strip. Evidently, as the shaft 53 rotates, the roller 58 will be thrown out by the cams and will remain away from them, unless means are provided for restoring the roller after each blow is delivered against it. The gear 52 drives a shaft 65, which finds bearings in the side wall 14 and the bracket 54. At its inner end this shaft carries a film draw roll 66 provided with sprocket teeth 67 properly lined up to mesh with the perforations of the film. As the machine operates, this draw sprocket will rotate at a uniform speed, so that the film will be delivered from it at a constant speed.

Reference to Fig. 1 will show the manner in which the film is to be fed through the machine. From the reel it passes to the front of the machine and over the takeup mechanism. It then passes down over the guides 24 and 25, against which it is pressed by the bars 29 and 30, which keep it properly lined up in front of the aperture and create a sufficient friction on it to insure smooth running. The film then passes down and under the rolls 59 of the kicking mechanism, and then up and over the draw sprocket, from which it may be delivered straight down into a basket, or to a receiving reel, if desired. Owing to the fact that the draw sprocket rotates at constant speed, the film will always be drawn away from the kicking mechanism.

In Fig. 1 the parts are shown by full lines in their initial position, that is, in the position which they occupy before the blow is delivered on the film by the kicking mechanism. In this case the tension device has moved out into the full line position to form a loop 44. In this case, also, the draw sprocket has carried over all, or practically all, of the excess film which was drawn down in the previous stroke. The parts should be so proportioned that at the instant before the kicking mechanism is operated, all of this excess film will have been drawn off, so that the film will just lie taut against the rollers 59. At this instant these rollers are kicked down, thus forming a loop, as shown by dotted lines in Fig. 1. The amount of movement of the rollers and the rate of rotation of the draw sprocket should be so proportioned that the film will be drawn past the aperture an amount exactly equal to the length of one picture, so as to insure smooth operation, although it is obvious that, in order to insure a film movement exactly equal to the length of the picture, during each stroke, it is only necessary that the draw sprocket should rotate a distance necessary to pull the film an amount equal to the length of one picture each time a blow is delivered. However, when the parts are proportioned in exactly the right ratio, the percentage of time necessary to move the film will be a minimum, and, therefore, most desirable, for it is evident that if the stroke of the kicking mechanism is too small, that is, not enough to move the film exactly one picture, the remaining film movement will be accomplished at slow speed and merely by the pull created by the rotation of the draw sprocket.

I will now describe more in detail the preferred form of framing mechanism. In the construction illustrated the framing bar is provided with two slots 67ª and 68, through which pass tap screws 69 and 70 which are threaded into a T-shaped bar 71, which forms part of the arm 57. These screws serve to hold the framing bar against the arms 71, tightly but flexibly, through the medium of springs 72. Sufficient friction is thus created between the parts, so that, after the position of the framing bar is once adjusted, the normal stresses coming upon it during operation will not throw it out of adjustment. A lever 73, pivoted at 74 to a stationary part of the mechanism, acts, through the medium of a link 75, to raise and lower the framing bar, for framing purposes.

The framing operation may best be understood by reference to Fig. 6. The roller 58 always lies in contact with the cam 55, because the film is always pulling upwardly against the roller 59. Therefore, if the pivotal point 62 is raised while the cam remains in the position illustrated, then the roller 59 will be raised a still greater amount, because it is farther from the cam than is the pivotal point 62. In like manner the lowering of the pivotal point, while the roller 58 remains in contact with the cam, will result in a lowering of the roller 59. It makes no difference what may be the position of the cam when the pivotal point is raised or lowered—the film roller 59 will be raised or lowered according as the pivotal point is raised or lowered. But the amount of stroke of the film roller is always the same—viz: that amount necessary to jerk the film a distance equal to one picture—and this is true because the cam 55 is properly formed to secure such result. Therefore, if the pivotal point be lowered the roller 59 will vibrate up and down a given distance between low limits, while if the pivotal point be raised the same amount of vibration will occur between high limits. Now the film perforations are always meshing with the teeth of the film draw-roll 66, which is rotating at continuous speed to pull film away from the kicking rolls. Suppose that at some instant before the roll 66 had opportunity to pull the film appreciably the pivotal point 62 were lowered. This would lower the roll 59 and the film would have to move down. Since the film could not pull backward on account of its meshing with the teeth of the roll 66, the film in front of the aperture would have to lower, and thus a new relation would be established between the film and the aperture. As the cam 55 and the draw-roll 66 continue to rotate, each picture of the film would occupy this new relation with respect to the aperture, or, in other words, the film would be framed. Of course, a similar framing action will ensue in case the pivotal point is moved up, because this will allow the film to occupy a higher position with respect to the aperture than otherwise.

Reference particularly to Fig. 6 will show that it is desirable, although not necessary, that the framing bar should move in a certain manner with respect to the cam, in order that the roller 58 of the kicking mechanism preserve the best relative position with respect to the cam for all positions of the framing bar. In the construction illustrated, the framing bar is shown as having a movement along a straight line situated at a particular angle with respect to other portions of the machine: it is shown as having a movement along the T bar 71. However, I do not restrict myself in any way to such movement, but contemplate within the scope of my invention any form of movement whereby the upper and lower limits of stroke of the kicking mechanism may be adjusted, and I include within the scope of my invention any mechanism for performing such adjustment, except as otherwise limited in the claims.

In the construction of kicking mechanism illustrated, it will be seen that, as the cam 55 moves over to the left in Fig. 6, it seems to press directly against the roller 58. However, owing to the fact that the entire kicking mechanism is pivoted at a point below the cam, binding will not occur between the parts, but the arms 60 and 61 will be pushed over to the left as the cam advances. Furthermore, by properly shaping the cam and other portions with respect to each other, the exact movements of the kicking mechanism can be predetermined, so that the film will be advanced during a predetermined percentage of the total time of the cycle of movements, and this can be done in such a way as to reduce the film accelerations to the lowest necessary amounts, thus minimizing the jerk and consequent strain thrown upon the film.

I will now describe the preferred form of shutter mechanism when it is desired to use one. An eccentric 76 is mounted on the shaft 53, preferably between the cam 55 and the pinion 51. The strap 77 of this eccentric serves to oscillate a bell crank 78 pivoted to the bracket 54 at 79, so that the end 80 is vibrated up and down. A bracket 81 is secured to the upper forward portion of the side wall 14 and is of such form that its arm 82 extends out far enough from the side wall to clear the main gear and extends down with its lower end somewhat below the optical axis of the lens. Two shutters, 83 and 84, pivoted to this bracket, are connected by means of links 85 and 86 to the end 80 of the bell crank in such a way that as the latter vibrates up and down the shutters will be oscillated back and forth in opposite directions. By means of this construction, the light is cut off from the lens, commencing at the opposite sides thereof and moving inwardly to the center, and light is admitted to the lens in a contrary manner. This arrangement insures a more perfect distribution of illumination, and, consequently, a more satisfactory projection on the screen. The shutters are preferably perforated in a well known manner.

In the preferred construction which is illustrated throughout the figures, the cam 55 as shown is provided with two diametrically opposite cam surfaces, so that two complete strokes are delivered to the kicking mechanism for each revolution of the shaft 53. During the same time one complete revolution is given to the bell crank, so that both of the shutters move up and down during the same interval of time. However, it is seen that the light is admitted to the lens and is cut off therefrom twice by such a movement of the shutters, so that the light is admitted once for each movement of the kicking mechanism.

Owing to the fact that all of the strains necessary for drawing the film, kicking it, and moving the shutters, are derived from the shaft 53, I have found that it is desirable to place a fly wheel 87 on the same. By placing the fly wheel on this shaft, the variations of torque coming upon the same are transmitted directly to and from the fly wheel and not through the intervention of the gear teeth. This insures smoother running and less wear and tear than otherwise, and also permits me to make the gears of lighter and less expensive construction than would otherwise be possible.

In order to insure that the film shall run smoothly over the sprocket 66, and to keep the teeth of the sprocket evenly in mesh with the perforations of the film, I provide a pair of fingers 88 and 89, which may be thrown over adjacent to the sprocket and which will encircle a portion of it. Each of these fingers is provided, in that portion thereof which engages the sprocket, with a rib 90, raised a sufficient amount to allow the sprocket teeth to pass under it. These fingers are carried by a shaft 91, which is suitably journaled adjacent to the rear wall 17 and passed out through the side wall 15, where it is provided with a lever 92, by means of which it can be rotated to raise the fingers away from the sprocket. In Fig. 7 I show more in detail the construction of these fingers, each of which is preferably stamped out from sheet metal and is looped back in the portion 93 so as to provide additional strength in its end adjacent to the shaft. A block 94 is secured to the shaft and is provided in its lower portion with an indentation 95, into which may seat a steel ball 96, or the equivalent. The ball can rise and fall in a socket 97, in the lower portion of which is placed a leaf-spring 98 which normally forces the ball upward. By this construction the fingers are maintained at a proper point adjacent to the sprocket or away from the same, according to the position of the shaft, but the fingers will not normally remain at any intermediate point. Also the parts should be so positioned that the fingers do not normally lie in frictional contact with the sprocket, but clear the same a slight amount to provide room for the film to pass beneath them and to reduce the friction.

I will now describe more in detail the preferred construction of bracket for carrying the film reel. This is in the form of a long arm 33, to the lower end of which are attached a pair of shoes 99 and 100, which lie flat against the top of the machine. A thumb screw 101 passes through the end of the shoe 99 in the top of the machine, and thumb screws 102 and 103 pass upwardly through the top of the machine into the shoe 100. Referring particularly to Fig. 8 these thumb screws provide a solid attachment for the bracket, which bracket terminates at its upper end in a sleeve 104, into which is entered a hollow tube 105, which serves as a bearing for the reel. Near the outer end of the tube, and to its upper portion, is pivoted a finger 106, which may be raised or lowered at will, by forcing in or out a rod 107, which passes through the tube and terminates in a button 108. A spring 109 normally forces the rod out, so as to project the end 110 of the finger below the tube in position to prevent the reel 111 from being slipped off from the tube.

Examination particularly of Figs. 3 and 4 will show that the rear wall 17 terminates at a point somewhat below the center of the body of the machine. The upper surface 112 of this wall is substantially flat. The rear end of the top wall 18 is bent in the form of a lip 113, in front of which may be inserted a plate 114 which carries the lens. After this plate has been properly inserted in place in front of this lip, it is swung down flush with the rear wall, so that it virtually becomes a portion of the same, and so that it rests on the edge 112. Stops 115 on the side walls serve to limit the inward movement of the plate 114. Owing to the fact that the center of gravity of the plate and lens is considerably outside of the point of support of the plate, the plate will remain in position on the machine when once it has been inserted in front of the lip, and swung down against the stops. By forming the parts with a comparatively tight fit, no difficulty is experienced in keeping the lens in proper position.

It will be understood that in the preferred construction the kicking mechanism is so proportioned and placed with respect to the other parts of the machine that it normally falls away from the cam. When the parts are thus proportioned, as preferred, the kicking mechanism will cease to operate immediately should the film break, because then there would exist no force for raising the mechanism up into engagement with the cam. For this reason the danger of tangling the film up in the other parts of the machine is practically eliminated, because the broken end of the film will simply pass over the sprocket and be delivered down into the basket or to a receiving reel.

I claim:

1. In a moving picture machine, the combination of means for drawing the film at substantially uniform speed, means for intermittently depressing the film at a point in advance of the drawing means, to cause an intermittent movement of the film past the aperture of the machine, and means for varying the upper and lower limits of movement of the depressing means for framing the film, substantially as described.

2. In a moving picture machine, the combination of a film-draw sprocket, means for rotating the same at substantially uniform speed, a cam geared to the sprocket, an oscillatable kicking mechanism, pivoted in position to be engaged by the cam and to be thrown by the same, and means for raising and lowering the pivotal point of the kicking mechanism, to determine the upper and lower limits of oscillation of the same, substantially as described.

3. In a moving picture machine, the combination of a film-draw sprocket, a cam geared to the same, an oscillatable kicking mechanism in the form of a bell crank, and pivoted in position such that one of its arms may engage the film at a point in advance of the sprocket, and such that the other arm may be engaged by the cam and be thrown by the same, means for rotating the cam and sprocket at substantially uniform speed, and means for raising and lowering the pivotal point of the kicking mechanism, to determine the upper and lower limits of the same to frame the film, substantially as described.

4. In a moving picture machine, the combination of a film-draw sprocket, a cam shaft geared to the same, a cam on the shaft, an oscillatable kicking mechanism suitably pivoted at a point to depress the film in advance of the sprocket, and adapted to be intermittently engaged by the cam, and a fly wheel on the cam shaft, substantially as described.

5. In a moving picture machine, the combination of a film-draw sprocket, a cam geared to the same, an oscillatable framing plate in position such that the kicking mechanism will engage the film at a point in advance of the draw sprocket and in position to be engaged and thrown by the cam, and normally tending to fall into lowered position and away from the cam, and means for raising and lowering the framing plate to raise and lower the pivotal point of the kicking mechanism, whereby the upper and lower limits of throw thereof are varied to frame the film, substantially as described.

6. In a moving picture machine, the combination of a film-draw sprocket, a cam shaft geared to the same, a cam on the cam shaft, an oscillatable kicking mechanism suitably pivoted at a point to depress the film in advance of the sprocket and to be intermittently engaged by the cam, an eccentric on the cam shaft, a bell crank pivoted to a stationary point of the machine, and having one arm connected to the eccentric, a shutter, and a connection from the other arm of the bell crank to the shutter, substantially as described.

7. In a moving picture machine, the combination of a pair of friction guideways, a film draw sprocket, a kicking mechanism interposed between the guideways and the sprocket, means for raising and lowering the kicking mechanism to determine the upper and lower limits of its movements, and means for intermittently actuating the kicking mechanism to depress the film at a point between the guideways and the sprocket, substantially as described.

8. In a moving picture machine, the combination of a pair of friction guideways, a film draw sprocket, an oscillatable kicking mechanism, means for raising and lowering the pivotal point thereof, and a rotating cam for intermittently actuating the kicking mechanism to depress the film at a point in advance of the film draw sprocket, the cam being suitably formed to actuate the kicking mechanism to depress the film a given distance as the pivotal point of the kicking mechanism is raised or lowered, substantially as described.

EDWARD H. SPERBERG.

Witnesses:
 Mary R. Frost,
 Thomas A. Banning, Jr.